(12) United States Patent
Suparna et al.

(10) Patent No.: US 11,449,776 B2
(45) Date of Patent: Sep. 20, 2022

(54) TOPOLOGY-BASED MIGRATION ASSESSMENT

(71) Applicant: MICRO FOCUS LLC, Santa Clara, CA (US)

(72) Inventors: Adarsh Suparna, Bangalore (IN); Hemant Kumar C H, Bangalore (IN); Pramod Annachira Vitala, Bangalore (IN)

(73) Assignee: MICRO FOCUS LCC, Santa Clara, CA (US)

(*) Notice: Subject to any disclaimer, the term of this patent is extended or adjusted under 35 U.S.C. 154(b) by 274 days.

(21) Appl. No.: 16/777,038

(22) Filed: Jan. 30, 2020

(65) Prior Publication Data
US 2020/0285975 A1    Sep. 10, 2020

(30) Foreign Application Priority Data
Mar. 6, 2019  (IN) .............................. 201941008788

(51) Int. Cl.
| | | |
|---|---|---|
| G06F 15/16 | (2006.01) | |
| G06N 5/04 | (2006.01) | |
| H04L 41/12 | (2022.01) | |
| H04L 67/10 | (2022.01) | |
| G06N 20/00 | (2019.01) | |

(52) U.S. Cl.
CPC .............. G06N 5/04 (2013.01); G06N 20/00 (2019.01); H04L 41/12 (2013.01); H04L 67/10 (2013.01)

(58) Field of Classification Search
CPC ........... H04L 41/12; H04L 67/10; G06N 5/04; G06N 20/00

USPC ........................................................ 709/203
See application file for complete search history.

(56) References Cited

U.S. PATENT DOCUMENTS

| | | |
|---|---|---|
| 8,886,777 B2 | 11/2014 | Salsburg |
| 9,189,294 B2 | 11/2015 | Considine et al. |
| 9,785,461 B2* | 10/2017 | Anerousis ............... H04L 41/16 |
| 9,804,879 B2* | 10/2017 | Anerousis ........... H04L 41/0813 |
| 10,079,730 B2 | 9/2018 | Subramanian et al. |

(Continued)

OTHER PUBLICATIONS

Briggs, et al; Enterprise Cloud Strategy; A Division of Microsoft Corp.; 2016; 238 pages.

(Continued)

*Primary Examiner* — Moustafa M Meky

(57) ABSTRACT

According to examples, an apparatus may include a processor that may generate a migration assessment for resources of a computer system. In particular, the apparatus may logically divide topological information to facilitate identification of a resource, components used by the resource, and dependencies. The system further enables users to specify user-defined migration parameters that specify the migration. For instance, the parameters may specify a cost associated with the migration of the component, a license model of the component, a security requirement of the component, a performance of the component, a customization of the component, or requirement of the component. Migration assessments and decisions may be stored to train machine-learned models. For instance, the model may assess whether a parameter will be satisfied by using a certain cloud service and whether substitutes have sufficiently satisfied dependencies based on observed migration assessments and actual migrations.

20 Claims, 8 Drawing Sheets

(56) References Cited

U.S. PATENT DOCUMENTS

| | | | |
|---|---|---|---|
| 10,379,910 B2* | 8/2019 | Balasubramanian | H04L 63/1433 |
| 2013/0191531 A1* | 7/2013 | Kruglick | H04L 41/5038 709/224 |
| 2014/0122577 A1* | 5/2014 | Balasubramanian | H04L 67/148 709/203 |
| 2016/0254943 A1 | 9/2016 | Maes | |
| 2016/0335105 A1* | 11/2016 | Anerousis | H04L 12/40 |
| 2016/0337480 A1* | 11/2016 | Anerousis | G06F 9/45558 |
| 2017/0012854 A1* | 1/2017 | Balasubramanian | H04L 43/14 |
| 2018/0191599 A1* | 7/2018 | Balasubramanian | H04L 63/1433 |
| 2018/0329981 A1 | 11/2018 | Gupte et al. | |
| 2021/0174280 A1* | 6/2021 | Ratnapuri | H04L 67/10 |

OTHER PUBLICATIONS

Hewlett-Packard Development Company, L,P,; CI Types Overview; Open Topic With Navigation; Nov. 19, 2018; 2 pages; http://cmshelpcenter.saas.hp.com/CMS/10.22/ucmdb-docs/docs/eng/doc_lib/Content/modeling/CitMan_c_Overview.htm.

Micro Focus; Cloud Assessment—UCMDB Integration; Jul. 2018; 3 Pages; https://docs.microfocus.com/itom/Cloud_Assessment:2018.07/Administration/Tasks/Integrations/bsm_ucmdb_integration.

Unknown Author; Scaling MVC vs. Scaling Multi-Tier Applications; Nov. 19, 2018; 4 pages https://stackoverflow.com/questions/5676718/scaling-mvo-vs-scaling-multi-tier-applications.

Micro Focus; Hybrid Cloud Management; Data Sheet, IT Operations Management;2018; 4 pages; https://www.microfocus.com/media/data-sheet/hybrid_cloud_management_ds.pdf.

Cybric; Improving Cloud Migration and Security: The Three Best Approaches; Dec. 3, 2018; pp. 6; https://www.cybric.io/improving-cloud-migration-security-three-best-approaches/.

Badhwar; The Growing Need for a Configuration Management Database (CMDB) for Public Cloud; Jun. 13, 2018; 8 pages; https://redlock.io/blog/configuration-management-database-cmdb-for-public-cloud.

* cited by examiner

```
┌─────────────────────────────────────────────────────────────┐
│                          MEMORY                             │
│                           700                               │
│   ┌─────────────────────────────────────────────────────┐   │
│   │          ACCESS A MIGRATION PARAMETER               │   │
│   │                      702                            │   │
│   └─────────────────────────────────────────────────────┘   │
│                                                             │
│   ┌─────────────────────────────────────────────────────┐   │
│   │   PERFORM AUTOMATED NETWORK DISCOVERY ON A FIRST    │   │
│   │                 COMPUTER SYSTEM                     │   │
│   │                       704                           │   │
│   └─────────────────────────────────────────────────────┘   │
│                                                             │
│   ┌─────────────────────────────────────────────────────┐   │
│   │   GENERATE TOPOLOGY INFORMATION RELATING TO THE     │   │
│   │  FIRST COMPUTER SYSTEM BASED ON THE AUTOMATED       │   │
│   │                     DISCOVERY                       │   │
│   │                        706                          │   │
│   └─────────────────────────────────────────────────────┘   │
│                                                             │
│   ┌─────────────────────────────────────────────────────┐   │
│   │ LOGICALLY DIVIDE THE TOPOLOGY INFORMATION INTO A    │   │
│   │ PLURALITY OF TOPOLOGICAL LAYERS, IN WHICH EACH      │   │
│   │ TOPOLOGICAL LAYER IS ASSOCIATED WITH A RESPECTIVE   │   │
│   │ SET OF COMPONENTS OF THE FIRST COMPUTER SYSTEM      │   │
│   │ USED BY A RESOURCE TO BE POTENTIALLY MIGRATED       │   │
│   │ FROM THE FIRST COMPUTER SYSTEM TO A CLOUD           │   │
│   │                COMPUTER SYSTEM                      │   │
│   │                      708                            │   │
│   └─────────────────────────────────────────────────────┘   │
│                                                             │
│   ┌─────────────────────────────────────────────────────┐   │
│   │ FOR EACH TOPOLOGICAL LAYER OF THE PLURALITY OF      │   │
│   │ TOPOLOGICAL LAYERS: IDENTIFY EACH COMPONENT FROM    │   │
│   │ AMONG THE RESPECTIVE SET OF COMPONENTS, AND FOR     │   │
│   │ EACH OF THE IDENTIFIED COMPONENTS, GENERATE AN      │   │
│   │ ASSESSMENT OF WHETHER THE IDENTIFIED COMPONENT      │   │
│   │ SHOULD BE MIGRATED TO THE CLOUD COMPUTER SYSTEM     │   │
│   │           BASED ON THE MIGRATION PARAMETER          │   │
│   │                         710                         │   │
│   └─────────────────────────────────────────────────────┘   │
│                                                             │
│   ┌─────────────────────────────────────────────────────┐   │
│   │  STORE THE ASSESSMENTS FOR THE PLURALITY OF         │   │
│   │  TOPOLOGICAL LAYERS IN ASSOCIATION WITH THE         │   │
│   │              TOPOLOGY INFORMATION                   │   │
│   │                       712                           │   │
│   └─────────────────────────────────────────────────────┘   │
└─────────────────────────────────────────────────────────────┘
```

*FIG. 7*

TOPOLOGY-BASED MIGRATION ASSESSMENT

BACKGROUND

The decision of whether or not to migrate resources of a computer system to the cloud or other system is a manually intensive task due to the complexities and dependencies of modern computer networks. For instance, a resource such as an enterprise application may have components that operate over multiple topological layers, including an application layer (front end interfaces and processes), a platform layer (such as middleware like database services), and an infrastructure layer (such as services that operate on the backend). The migration decision is further complicated by the existence of diverse cloud systems each providing different levels of cost, service, performance, and available resources.

BRIEF DESCRIPTION OF THE DRAWINGS

Features of the present disclosure may be illustrated by way of example and not limited in the following figure(s), in which like numerals indicate like elements, in which:

FIG. 7 depicts a block diagram of an example non-transitory machine-readable storage medium for generating and storing migration assessments in association with topology information.

DETAILED DESCRIPTION

Figure 1:
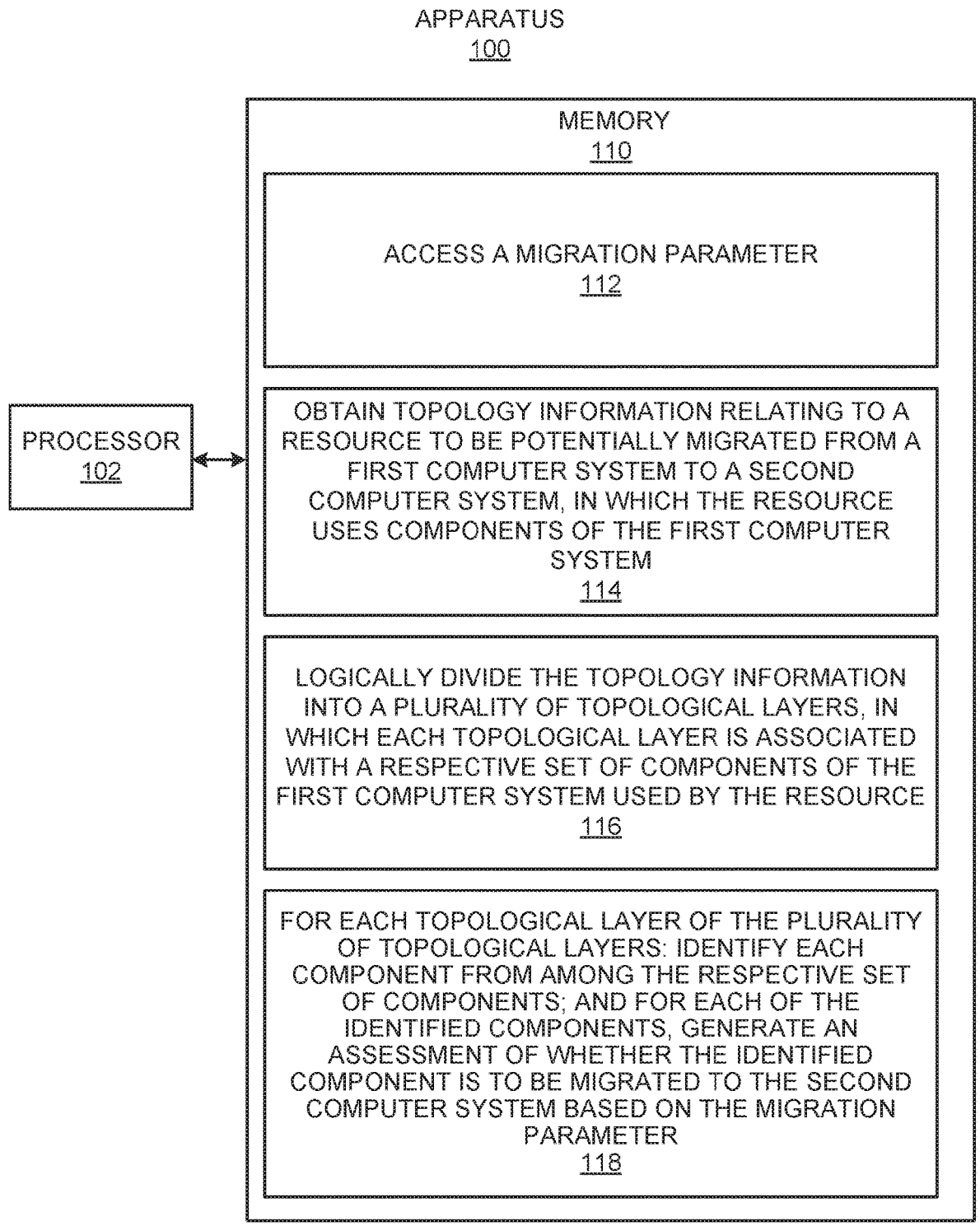
FIG. 1 shows a block diagram of an example apparatus that generates a migration assessment based on topology information.

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

The disclosure relates to migrating resources of a computer system to another computer system such as a cloud computer system. In particular, the disclosure relates to apparatuses and methods that leverage topological information stored in configuration management databases (CMDB) to generate migration assessments. A resource may include an application, a service, or other functional process of the computer system. In operation, a resource may use components of the computer system. A component itself may include, among other things, applications, services, and/or other items of, or provided by, the computer system. The topological information may store information about each resource, including each component used, dependencies, configurations, operating systems, applications used, etc. A migration assessment may include a recommendation of whether or not to migrate a resource, which may depend on whether each component used by the resource may be migrated. Furthermore, the migration assessment may include a recommendation to migrate some components of a resource while keeping other components at the computer system.

The topological information may be used to generate assessments of whether a component should be or can be migrated to the cloud or other computer system. The assessments may be automatically generated and made available with the topological information. The topological information may be logically divided into topological layers to facilitate identification of a resource, components used by the resource, and dependencies (each of which is generally required by each component). For example, components in an application layer may have different types of dependencies than those in a platform layer. A component's dependencies may be used to assess whether or not the component may be or should be migrated to a cloud system based on whether or not that cloud system provides a component that satisfies the dependency. If not, appropriate substitute components that are available at the cloud system may be identified and use of the substitute components may be recommended or may different cloud systems that satisfy the dependency may be identified.

According to examples, users may be enabled to specify user-defined parameters that specify migration. For instance, the parameters may specify a cost associated with the migration of the component, a license model of the component, a security requirement of the component, a performance of the component, a customization of the component, a requirement of the component, or the like. Migration assessments and decisions may be stored to train machine-learned models. For instance, a machine-learned model may assess whether a parameter will be satisfied by using a certain cloud service and whether substitutes have sufficiently satisfied dependencies based on observed migration assessments and actual migrations.

Reference is first made to FIG. 1, which shows a block diagram of an example apparatus 100 that generates a migration assessment based on topology information. It should be understood that the example apparatus 100 depicted in FIG. 1 may include additional features and that some of the features described herein may be removed and/or modified without departing from any of the scopes of the example apparatus 100.

The apparatus 100 shown in FIG. 1 may be a computing device, a server, or the like. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, it should be understood that the apparatus 100 may include multiple processors, multiple cores, or the like, without departing from the scopes of the apparatus 100 disclosed herein.

The apparatus 100 may include a memory 110 that may have stored thereon machine-readable instructions (which may also be termed computer readable instructions) 112-118 that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals. Attention will now turn to operations at processor 102 to generate a migration recommendation based on topology information.

Referring to FIG. 1, the processor 102 may fetch, decode, and execute the instructions 112 to access a migration parameter. Examples of a migration parameter are discussed herein, for instance, with respect to FIG. 2.

The processor 102 may fetch, decode, and execute the instructions 114 to obtain topology information relating to a resource to be potentially migrated from a first computer system to a second computer system, in which the resource may use components of the first computer system.

The processor 102 may fetch, decode, and execute the instructions 116 to logically divide the topology information into a plurality of topological layers, in which each topological layer may be associated with a respective set of components of the first computer system used by the resource.

The processor 102 may fetch, decode, and execute the instructions 118 to, for each topological layer of the plurality of topological layers: identify each component from among the respective set of components; and for each of the identified components, generate an assessment of whether the identified component is to be migrated to the second computer system based on the migration parameter.

Figure 2:
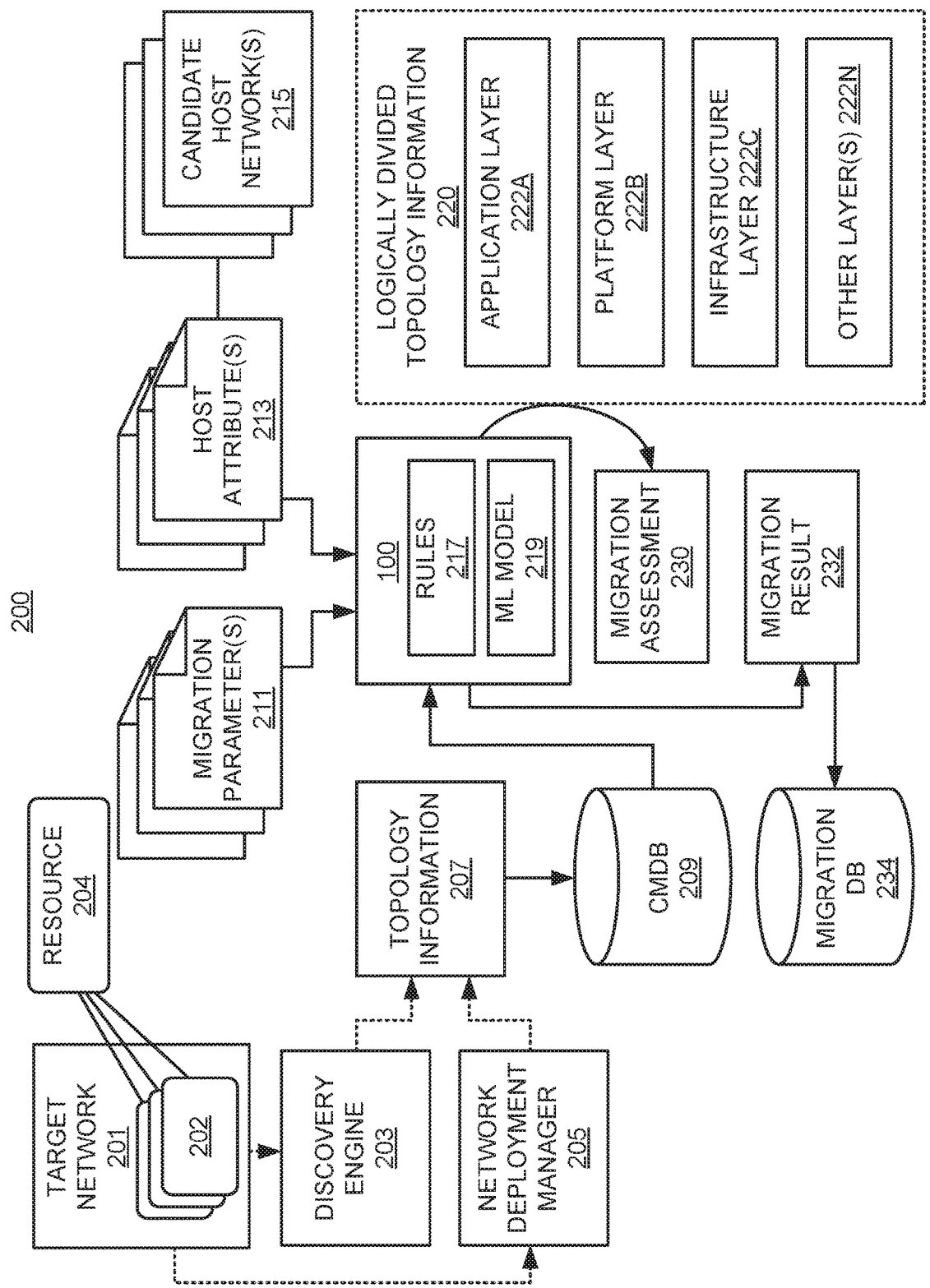
FIG. 2 shows a block diagram of an example system data flow for generating a migration assessment based on topology information.

Reference will now be made to an example environment in which the apparatus 100 may operate, including further examples of details of such operation, with respect to FIG. 2. FIG. 2 shows a block diagram of an example system data flow 200 for generating a migration assessment 230 based on topology information 207. The topology information 207 may describe a target network 201 from which to potentially migrate a resource 204 to a candidate host network 215. The candidate host network 215 may be off-premises relative to the target network 201. The target network 201 will also be referred to interchangeably herein as "computer system." In some examples, the candidate host network 215 may include a cloud-based network offered by a cloud service provider. In these examples, the host attributes 213 may include a cloud image that specifies available resources at the cloud-based network.

Components 202, resources 204, and topology information 207 will be described first, followed by a description of how the apparatus 100 may analyze the components, resources, and topology information to generate a migration assessment 230.

The target network 201 may include a plurality of components 202. A component 202 may be categorized according to a Configuration Item (CI) type that describes a type of the component 202. The CI type for a component 202 may be included in the topology information 207. CI types may include, without limitation, a physical hardware device or software installed at the target network 201, a business element, a process record that records changes to a business, a monitor that handles metrics relating to a business, a location that describes a location of devices, people or services of a business, a party that describes an entity, a CI collection that includes a logical collection of CIs, and/or other types of components that make up, is provided by or relates to an entity, such as an entity that operates the target network 201.

In some examples, each component 202 may be associated with an attribute that describes a feature of the component. An attribute may include an operating system (OS) type, an OS version, a security requirement, a level of customization (such as a deviation from an off-the-shelf state), a hardware requirement such as processor speed or storage requirement, and/or other types of features. Some attributes of the component 202 may be required for the component 202 to operate, either literally based on technical requirements (such as requiring a specific OS to execute) and/or compliance requirements (such as requiring a certain level of security or logging). An attribute may therefore specify a dependency of the component 202. Put another way, to migrate a resource 204 to a candidate host network 215, the dependencies (or requirements) of a component 202 used by the resource 204 and/or the component 202 itself must be available at the candidate host network.

The resource 204 (to be potentially migrated) may execute on or otherwise be provided by the target network 201. For example, the resource 204 may include an enterprise application or service executing on or provided by the target network 201. Other types of resources 204 that may be migrated from one computer network to another computer network may be analyzed as well. The decision of whether to migrate the resource 204 may be complex due to the way in which the resource 204 uses the target network 201, technical performance reasons, business reasons, and/or other reasons. This may be particularly true for resources 204 that have a multi-tier architecture, although the decision of whether to migrate other types of resources 204 may be difficult as well. For instance, the resource 204 may use different types of components 202, which may be distributed throughout the target network 201. It should be noted that a resource 204 may include a specific type of component 202. For example, a resource 204 may include a component 202 that is an enterprise application to be potentially migrated from the target network 201 to a candidate host network 215. It is further noted that some types of components 202 such as applications may themselves be migrated. Other types of components 202 (such as hardware components) may not be migrated. For example, the enterprise application may use a particular hardware component. To assess whether the enterprise application may be migrated, the apparatus 100 may identify an attribute of the hardware component (such as memory requirement) that may be required by the enterprise application. The attribute may be used in making the migration assessment.

In examples, the topology information 207 may specify relationships between components 202. For example, the topology information 207 may specify relationships between components that are hardware or software CI types. Such relationships may include parent/child relationships, dependency relationships, and/or other types of relationships. Dependency relationships may specify that a first component 202 requires a second component 202. Thus, if a resource 204 to be potentially migrated uses the first component 202, then the apparatus 100 may select a candidate host network 215 at which both the first and second components (or suitable replacements) are available.

The topology information 207 may be derived from a discovery engine 203, which may discover the components 202 of the target network 201 to generate the topology information. Alternatively or additionally, the topology information 207 may be derived from a network deployment manager 205 that is used to deploy the component 202 to the target network 201. In either example, the topology information 207 may be stored in a repository, such as the Configuration Management Database (CMDB) 209. The CMDB 209 may provide the topology information 207 in various ways, such as via an extensible markup language (XML) format, which may be parsed by the apparatus 100.

In examples, the apparatus 100 may access and logically divide the topology information 207 into a plurality of topology layers 222 (illustrated in FIG. 2 as application layer 222A (which is a topology layer 222 that includes an application layer), platform layer 222B (which is a topology layer 222 that includes a platform layer), infrastructure layer 222C (which is a topology layer 222 that includes a topology layer), and other layers 222N) to generate logically divided topology information 220. The topology layers 222 may include an application layer 222A, a platform layer 222B, an infrastructure layer 222C, and/or other types of topology layers 222N. When referring to a topology layer generally, the disclosure will refer to a "topology layer 222." When referring to examples of specific topology layers 222, the disclosure will refer to the application layer 222A, the platform layer 222B, or the infrastructure layer 222C. The apparatus 100 may identify a component 202 from the topology information 207 based on the CI type of the component 202. In examples, the apparatus 100 may assign the component 202 to an appropriate topology layer 222. Such assignment may be based on the CI type of the component 202. For example, a component 202 having a CI type indicating the component is an application may be assigned to the application layer 222A. A component 202 having a CI type indicating the component is a database platform component may be assigned to the platform layer 222B. A component 202 having a CI type indicating the component is an infrastructure component may be assigned to the infrastructure layer 222C.

Because a topology layer 222 may be associated with different types of components 202 than another topology layer 222, logically dividing the topology information 207 facilitates discovery of dependencies of different types of components. For instance, a component 202 that is an application may have different relationships such as dependencies than another component 202 that is a database platform component. In particular, an application may have dependencies across different topological layers 222. The application may require, for example, another application such as a particular front end interface or operating system in the application layer 222A, a particular database platform in the platform layer 222B, and a backend service like an authentication service in the infrastructure layer 222C. A database platform component may, on the other hand, simply require a particular hardware configuration in the platform layer 222B. As such, these components 202 may require a different analysis. By logically dividing the topology information 207 into different topology layers 222, the apparatus 100 facilitates component discovery and analysis for migration assessments 230.

Generating a Migration Assessment

In examples, the apparatus 100 may obtain a trigger to generate a migration assessment 230. The trigger may include a request from a user (such as a system administrator of the target network 201) to generate the migration assessment 230, creation of or update to the topology information 207, passage of a predefined amount of time, and/or other initiation to generate the migration assessment. The migration assessment 230 may relate to a specific resource 204, a specific component 202, a specific layer in which case the migration assessment may relate to all resources and/or components of a topology layer 222, and/or other portions of the target network 201. The migration assessment 230 may include an indication of whether a resource 204 is able to be migrated, a migration recommendation that indicates whether the resource should be migrated, attributes of such migration (such as a resulting fee, performance, etc.), identification of a candidate host network 215 to which migration should occur, a recommendation to use a component 202 using a "bring your own license" (BYOL) model, and/or other information pertaining to a migration.

The apparatus 100 may generate the migration assessment 230 based on a migration parameter 211, a host attribute 213, the logically divided topology information 220, and/or other data.

A migration parameter 211 may specify a value that may be used to assess whether to migrate a resource 104. For example, the migration parameter 211 may specify a fee or budget allocated for hosting the migrated resource (such as for examples in which a cloud service provider or others charge a fee for hosting the migrated resource), a license model (such as a "bring your own license" or BYOL) used by a resource or component to be migrated, security policy requirement, performance requirement, customization level, external factors such as government regulations, data privacy, and enterprise requirements, and/or other parameters. In particular, as one example, if an enterprise obtained a software license, then the licensed software may be used instead of software provided at a candidate host network 215, such as a cloud-based network. In this example, if a component 202 or resource 204 is an application to be migrated, and that application is licensed from a third party, then the apparatus 100 may recommend that the licensed application be used instead of an application provided by the candidate host network 215. In this manner, the migration assessment 230 may take into account licensing considerations in addition to or instead of strictly technical considerations. In some examples, the migration parameter 211 may be specified by a user (such as a system administrator).

A host attribute 213 may specify services provided by a corresponding candidate host network 215. The host attribute 213 may include, for example, a fee for services (which may be specified as a rate or flat fee), performance of services, available applications, and/or other offerings of the candidate host network 215. For example, CSPs may publish or otherwise make available cloud images that specify host attributes 213 for its cloud services. The apparatus 100 may access the host attribute 213 to generate the migration assessment 230.

The apparatus 100 may identify a resource 204 to be potentially migrated. For instance, the apparatus 100 may identify an enterprise application for which to generate the migration assessment 230. The resource 204 may be identified by a user (in which case the user wishes to obtain the migration assessment 230), identified based on a review of all resources 204, and/or other identification source. The apparatus 100 may logically divide the topology information 207 to generate the logically divided topology information 220 and/or access the logically divided topology information 220 that was previously generated and stored. In either example, the apparatus 100 may identify requirements for migrating the resource 204. For instance, using the logically divided topology information 220, the apparatus 100 may identify any components 202 (and any corresponding requirements of the component) used by the resource 204 at each topology layer 222. In this way, requirements of the resource 204 may be identified across different topology layers 222. For instance, continuing the enterprise application example, the enterprise application may use a front end web interface at an application layer 222A, a database service at a platform layer 222B, and backend services like user authentication at an infrastructure layer 222C. The apparatus 100 may therefore identify the requirements of the enterprise application across the different topology layers 222 on which the enterprise application executes.

In examples, for each of the components 202 at each topology layer 222, the apparatus 100 may identify all requirements and generate a migration assessment 230. As previously noted, the migration assessment 230 may relate to a single component 202, a single resource 204, a single topology layer 222, and/or other portion of the target network 201. For example, the apparatus 100 may assess whether a component 202 used by the resource may be migrated to a candidate host network 215 based on the requirements of the component 202 and the host attributes 213. Examples of topologies and how the apparatus 100 may generate the migration assessment 230 will now be described with reference to FIGS. 2-4.

Figure 3:
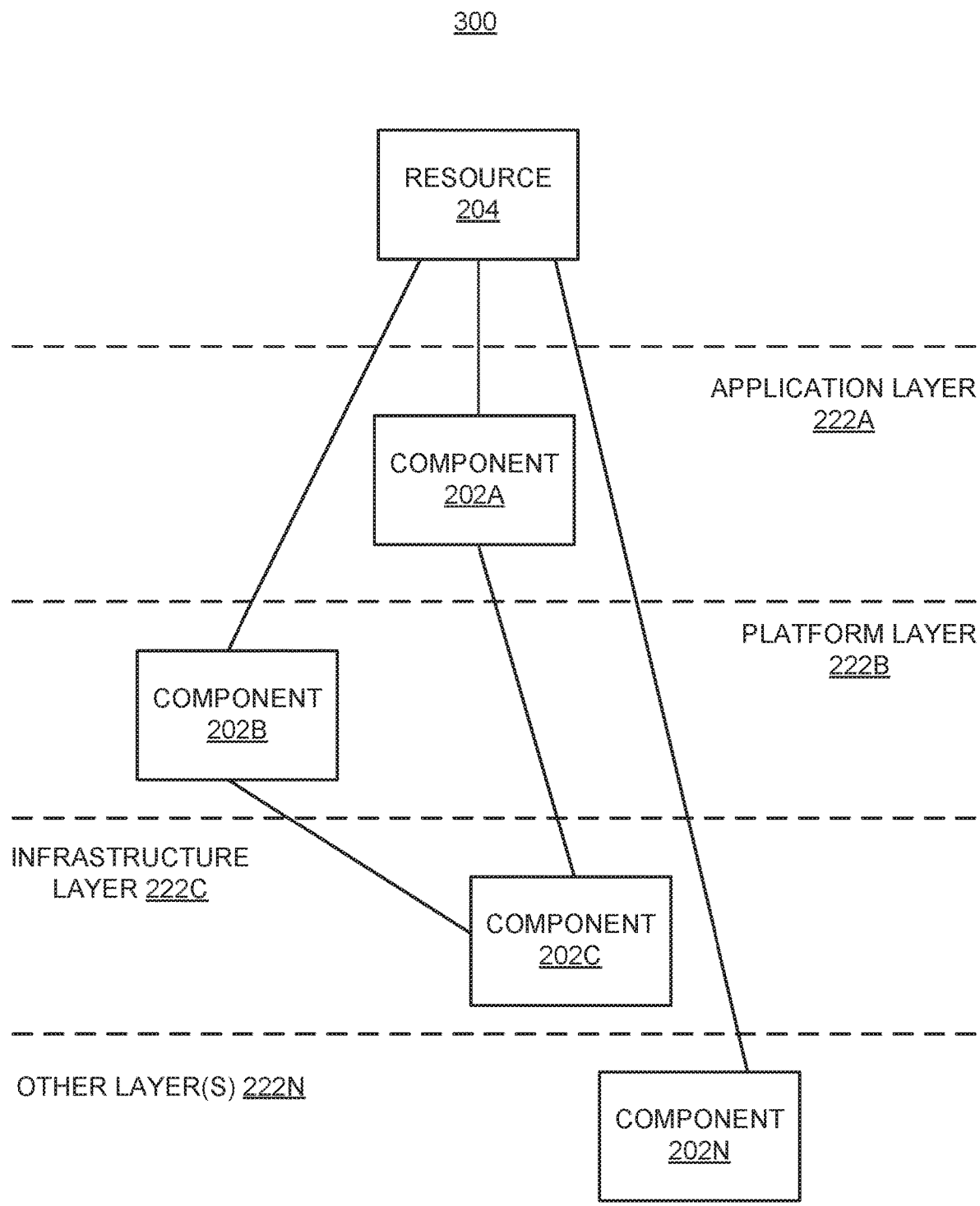
FIG. 3 shows a schematic diagram of topology information for a resource.

Referring to FIG. 3, which shows a schematic diagram 300 of topology information 207 for a resource 204, the resource 204 may use a plurality of components 202. For instance, the resource 204 may include an enterprise application that uses a component 202A of an application layer 222A, a component 202B of a platform layer 222B, a component 202C of an infrastructure layer 222C, and/or other components 202N at other layers 222N. When the resource 204 has been identified for determining whether to migrate the resource, the apparatus 100 may logically divide the topology information 207 into the application layer 222A, the platform layer 222B, the infrastructure 222C, and/or other layers 222N and analyze each component 202 of each platform layer 222. For example, the apparatus 100 may identify dependencies of each component 202A-N. Such dependencies may be to another component 202 on the same topology layer 222. For example, for component 202A, the apparatus 100 may identify other applications used by the component 202A. For component 202B, the apparatus may identify all platform-related dependencies. For component 202C, the apparatus 100 may identify all infrastructure-related dependencies, and so on. Alternatively or additionally, such dependencies may include other components on a different topology layer 222 (for instance, component 202A may use and depend upon component 202C as illustrated as a line connecting these components in FIG. 3).

Figure 4:
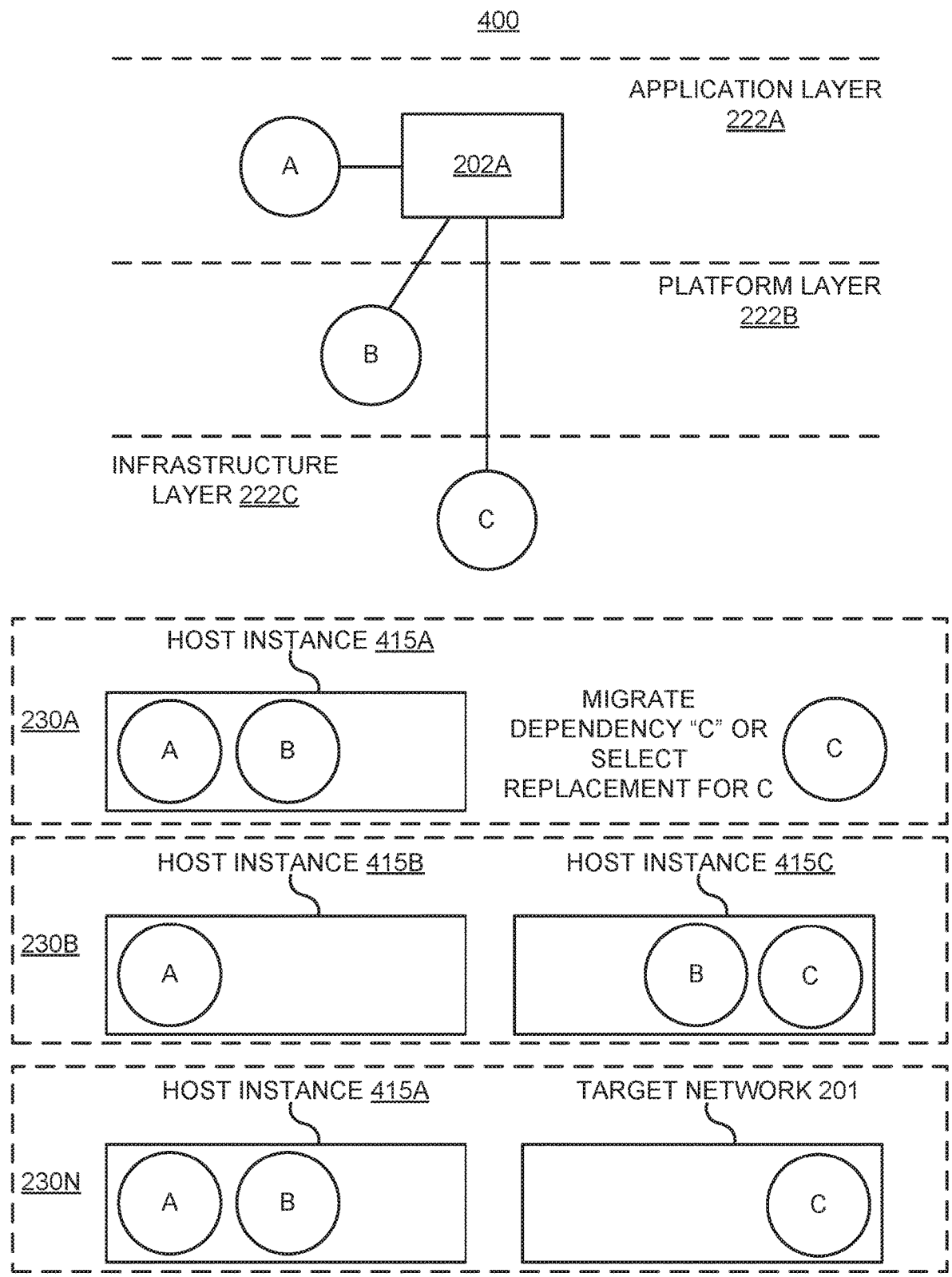
FIG. 4 shows a schematic diagram of comparing dependencies of a component with available components at a candidate host network.

Dependency analysis will now be described with reference to FIG. 4, which shows a schematic diagram 400 of comparing dependencies of a component 202 with available components at a candidate host network 215. In examples, the apparatus 100 may identify dependencies of a component 202. For example, component 202A includes a dependency (A), a dependency (B), and a dependency (C). Dependencies (A)-(C) are shown as being in respective topology layers 222. However, the dependencies of a component 202 may span different numbers (or single) topology layer 222.

The apparatus 100 may access host instances 415A-C to determine whether any one of these host instances satisfy the dependencies (A)-(C) and generate migration assessments 230A-N accordingly. For example, host instance 415A may satisfy dependencies (A) and (B) but not (C); host instance 415B may satisfy dependencies (A), but not (B) and (C); host instance 415C may satisfy dependencies (B) and (C), but not (A). In this example, the apparatus 100 may generate a migration assessment 230A, 230B, 230N, and/or other migration assessments.

The migration assessment 230A may include a recommendation to use host instance 415A and migrate dependency (C). Thus, because component 202A requires dependencies (A)-(C) and dependencies (A) and (B) are already available at host instance 415A, the migration assessment 230A may recommend migrating the necessary dependency (C) to the host instance 415A so that the component 202A may execute on host instance 415A (with the newly migrated dependency (C)). In some instances, the user may be provided with an option to automatically migrate dependency (C) if the user accepts the recommendation provided in the migration assessment 230A.

The migration assessment 230B may include a recommendation to use host instance 415B and 415C together. For example, different cloud images (which may be provided by a single CSP) may make available different sets of services that are dependencies of a given component. The migration assessment 230B may therefore, in these examples, make a recommendation that host instances 415B and 415C both be used because they together provide all the dependencies required by component 202A.

The migration assessment 230N may include a recommendation to use host instance 415A and keep dependency (C) at the target network 201. In other words, the migration assessment 230N may include a recommendation to use host instance 415A for dependencies (A) and (B) and not migrate dependency (C). Other combinations of recommended migration plans may be used as well. In some instances, if a dependency is not met, then the apparatus 100 may select and recommend a suitable potential replacement that is available at a selected one of the candidate host networks 215.

In some examples, the apparatus 100 may make the determination of whether to migrate the component 202 or its dependencies A-C subject to a migration parameter 211. For instance, if a migration parameter 211 specifies that a certain network performance is required (such as a specified maximum latency, minimum storage requirement, etc.), then the apparatus 100 may determine whether a candidate host network 215 will satisfy the requirement based on the host attribute(s) 213. Other migration parameters 211 may be considered as well. The apparatus 100 may continue this process until all of the requirements of the resource 204 are analyzed across all of the topology layers 222. It should be noted that some resources 204 may not have requirements across all topology layers 222. It should be further noted that the apparatus 100 may recommend migrating some components 202 used by the resource 204 but not other components 202 used by the resource. Furthermore, the apparatus 100 may recommend migrating all components 202 from a particular topology layer 222 but not migrating any of the components 202 from another topology layer 222.

Referring back to FIG. 2, in examples, the apparatus 100 may generate the migration assessment 230 based on a rule-based scheme using pre-stored rules 217 or based on a machine-learned scheme using a machine-learned (ML) model 219. The rule 217 may predefine logic to generate the migration assessment 230. For instance, a rule 217 may specify that certain migration parameters 211 be used (or not used) when making a migration assessment 230. In some examples, a rule 217 may specify which combinations or potential replacements for components 202 may be used if a component 202 is unavailable at a candidate host network 215. If some examples, a rule 217 may specify a permissible level of deviation from a value specified in a migration parameter 211. For example, the rule 217 may specify that a maximum fee specified by a migration parameter 211 may be exceeded by a certain amount (for examples in which migrating to a candidate host network 215 such as a cloud-based network is associated with a fee), that minimum storage requirement may fall below a certain amount, and/or other deviation from a migration parameter 211.

In examples, the apparatus 100 may generate the migration assessment 230 based on the ML model 219. The ML model 219 may be trained based on previous migration results 232 correlated to various migration parameters 211, components 202, and resources 204, For instance, the ML model 219 may correlate migration success/failures with other aspects of the migration result 232, such as the resource 204 migrated, the candidate host network 215 to which the resource was migrated, any replacements used for dependencies of the resource 204 or components 202 used by the resource, and/or aspect of the migration. In this manner, the ML model 219 may learn which components 202 may be replaced successfully (or not successfully)—or put another way, which combination of components 202 may satisfy a requirement for migration, which candidate host network 215 successfully (or not successfully) hosted a migrated resource 204, which migration parameters 211 were satisfied by the candidate host network 215, and/or other observations that correlates migration outcomes with various aspects of the migration.

In examples, the apparatus 100 may automatically migrate the resource 204. Such migration may use a "lift and shift" approach. The migration may be based on the migration assessment 230. In some examples, the apparatus 100 may access or generate a migration result 232. The migration result 232 may include an assessment by a human user of whether the migration was successful or may include an automated assessment that the migration was successful. The automated assessment may include the apparatus 100 testing that the migration succeeded, such as by passing a compilation test or other validation test.

In examples, the migration result 232 may include an indication of the resource 204 migrated, any component 202 used by the resource 204 that was migrated (or that was available at the candidate host network 215 for hardware or other components that cannot be migrated), the candidate host network 215, host attributes 213, and/or other aspect of the migration. The migration result 232 may be stored in a repository, such as migration database (DB) 234. The ML model 219 may access the migration result 232 and/or other migration results from the migration DB 234 to be trained/retrained based on the migration result, as previously described.

It should be noted that the apparatus 100 depicted in FIG. 2 is shown without further details such as the processor 102 and various stored instructions. However, the apparatus 100 depicted in FIG. 2 may include various instructions that program the processor 102 that cause the processor to perform the various operations described with respect to FIG. 2. Furthermore, the discovery engine 203 and the network deployment manager 205 may each include its own processor, similar to processor 102, and instructions for executing their respective functions described herein. In some examples, the functionality described with respect to the discovery engine 203 and/or the network deployment manager 205 may be integrated with the apparatus 100. As such, the apparatus 100 may perform network discovery on the target network 201 and/or deploy a portion or all of the target network 201.

Figure 5A:
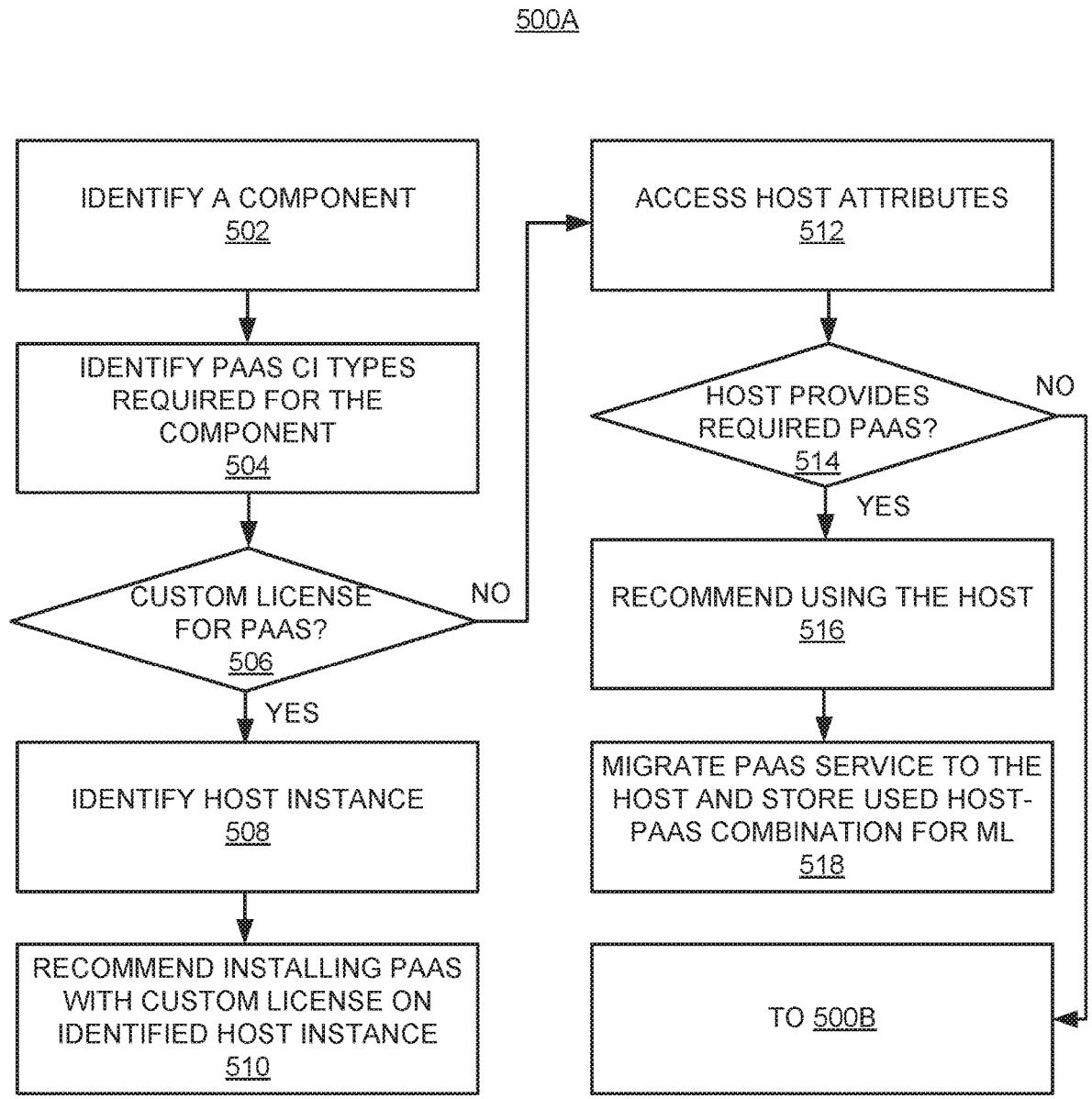
FIG. 5A depicts a flow diagram of an example method for assessing migration of Platform as a Service (PaaS) services.
Figure 5B:
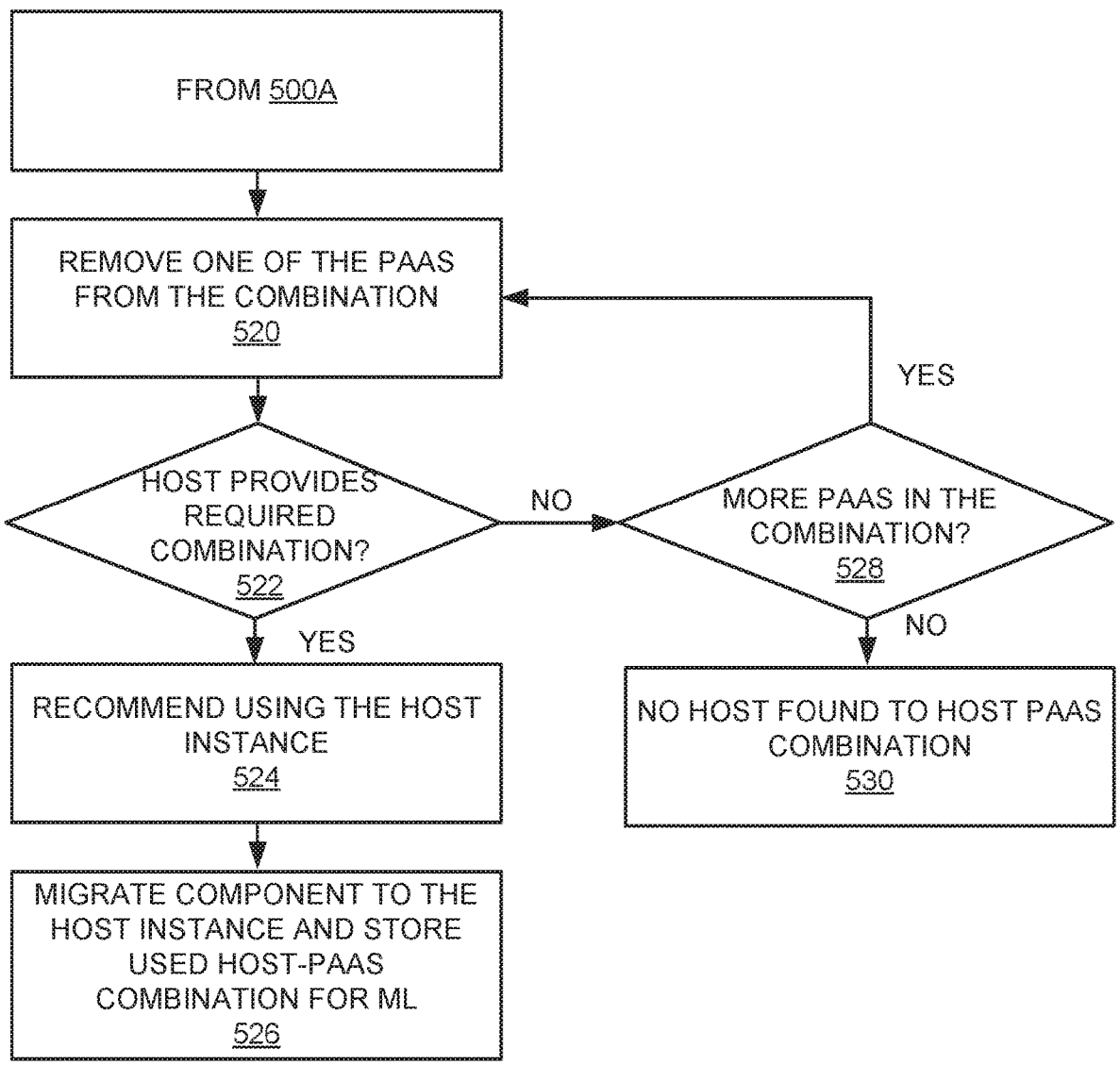
FIG. 5B depicts a flow diagram of an example method for assessing migration of Platform as a Service (PaaS) services.
Figure 6:
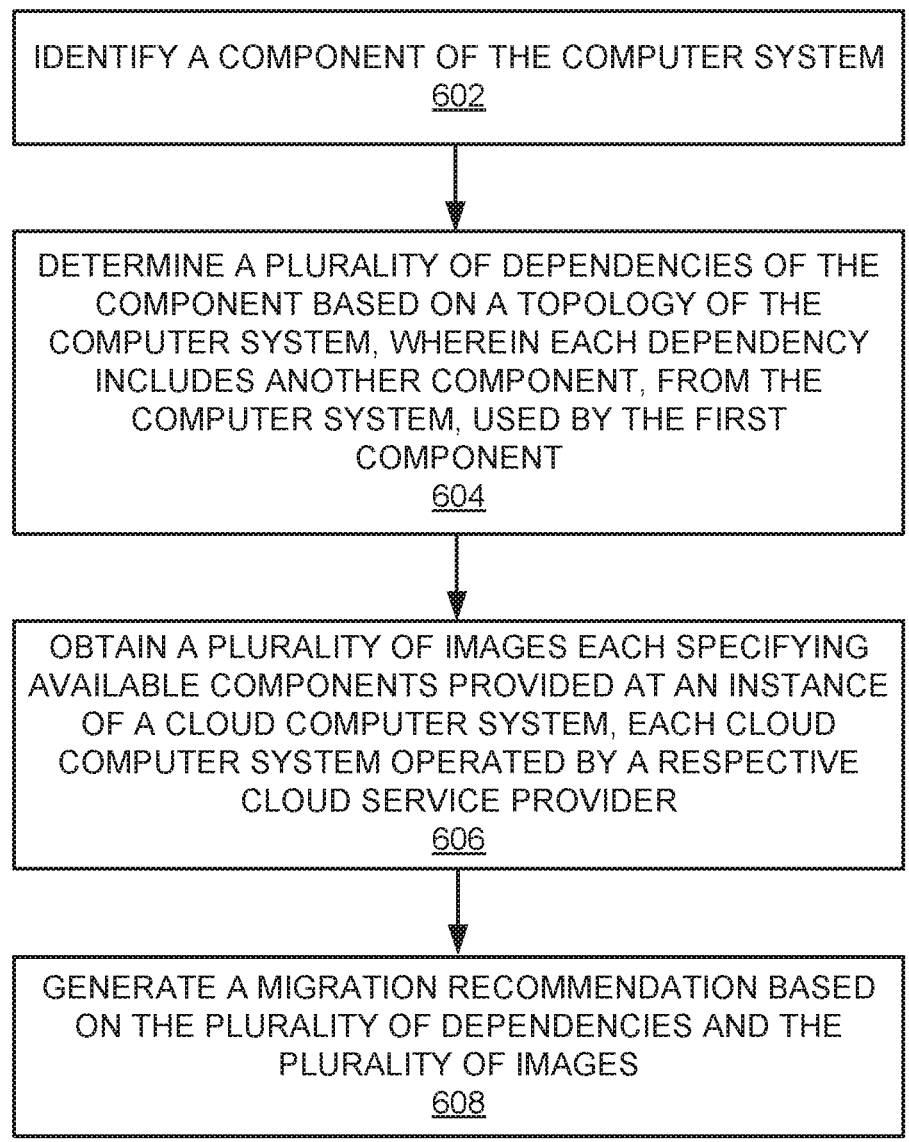
FIG. 6 depicts a flow diagram of an example method for generating a migration recommendation based on component dependencies.

Various manners in which the apparatus 100 may operate to generate migration assessments are discussed in greater detail with respect to the methods 500A, 500B, and 600 respectively depicted in FIGS. 5A, 5B, and 6. It should be understood that the method 600 may include additional operations and that some of the operations described therein may be removed and/or modified without departing from the scopes of the method 600. The descriptions of the methods 500A, 500B, and 600 may be made with reference to the features depicted in FIGS. 1-3 for purposes of illustration.

FIG. 5A depicts a flow diagram of an example method 500A for assessing migration of Platform as a Service (PaaS) components. Some or all of the operations set forth in the method 500A may be included as utilities, programs, or subprograms, in any desired computer accessible medium. In addition, the method 500A may be embodied by computer programs, which may exist in a variety of forms. For example, some operations of the method 500A may exist as machine-readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

At 502, the processor 102 may identify a component, such as component 202 based on topology information.

At 504, the processor 102 may identify requirements of the component such as a service having a CI type indicating the service is a PaaS service. Such PaaS service may include middleware components such as a database service, operating system service, and/or other types of services that may be provided on a candidate host platform, such as a cloud-based network offered by a CSP.

At 506, the processor 102 may determine whether a custom license has been acquired for a PaaS service identified at 504.

If a custom license has been acquired for the PaaS service, at 508, the processor 102 may identify a host instance to host the PaaS service. At 510, the processor 102 may recommend installing the PaaS service with the custom license on the host instance identified at 510. If there are more PaaS services requirements (other than the custom-licensed service) to be analyzed, then processing may proceed to 512, which is described below.

Returning to 506, if no custom license has been acquired, at 512, the processor 102 may access host attributes of the host instance.

At 514, the processor 102 may determine whether the host instance provides the required PaaS services based on the host attributes.

If the host provides the required PaaS services, at 516, the processor 102 may recommend using the host. At 518, the processor 102 may migrate the component to the host instance and store the indication of the migration (including any PaaS combination at the host instance) for ML.

Returning to 514, if the host instance does not provide the required PaaS services, then processing may proceed to method 500B.

FIG. 5B depicts a flow diagram of an example method 500B for assessing migration of Platform as a Service (PaaS) services.

At 520, the processor 102 may remove one of the PaaS services from the required PaaS services. The processor 102 may do so in an attempt to find a host instance that provides the PaaS service combination without the removed one of the PaaS services.

At 522, the processor 102 may determine whether any host instance provides the required PaaS services (less PaaS service removed at 520).

If a host instance provides the required PaaS services, at 524, the processor 102 may recommend using the host instance.

At 526, the processor 102 may migrate the component to the host instance and store the combination of PaaS services and indication that the component was migrated for ML.

Returning to 522, if no host instance provides the required combination, at 528, the processor 102 may determine whether more PaaS services are in the PaaS combination. If more PaaS services are in the PaaS combination, the processor 102 may return to 520, in which another PaaS service is removed from the PaaS combination and processing thereafter continues as before. If no more PaaS services are in the PaaS combination, at 530, the processor 102 may determine there is no host instance that can host the component without migrating all of the PaaS services. As such, the processor 102 may generate a migration assessment indicating no host instance that can host the component without migrating all of the PaaS services and/or a recommendation to migrate the missing PaaS services.

FIG. 6 depicts a flow diagram of an example method 600 for generating a migration recommendation based on component dependencies. Some or all of the operations set forth in the method 600 may be included as utilities, programs, or subprograms, in any desired computer accessible medium. In addition, the method 600 may be embodied by computer programs, which may exist in a variety of forms. For example, some operations of the method 600 may exist as machine-readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

As shown in FIG. 6, at block 602, the processor 102 may identify a component of the computer system. At block 604, the processor 102 may determine a plurality of dependencies of the component based on a topology of the computer system. Each dependency includes another component, from the computer system, used by the first component.

At block 606, the processor 102 may obtain a plurality of images each specifying available components provided at an instance of a cloud computer system, each cloud computer system operated by a respective cloud service provider. At block 608, the processor 102 may generate a migration recommendation based on the plurality of dependencies and the plurality of images, FIG. 7 depicts a block diagram of an example non-transitory machine-readable storage medium 700 for generating and storing migration assessments in association with topology information. The non-transitory machine-readable storage medium 700 may be an electronic, magnetic, optical, or other physical storage device that includes or stores executable instructions. The non-transitory machine-readable storage medium 700 may be, for example, Random Access memory (RAM), an Electrically Erasable Programmable Read-Only Memory (EEPROM), a storage device, an optical disc, and the like. The non-transitory machine-readable storage medium 500 may have stored thereon machine-readable instructions 702-710 that a processor, such as the processor 102, may execute.

The machine-readable instructions 702 may cause the processor to access a migration parameter.

The machine-readable instructions 704 may cause the processor to perform automated discovery on a first computer system.

The machine-readable instructions 706 may cause the processor to generate topology information relating to the first computer system based on the automated discovery.

The machine-readable instructions 708 may cause the processor to logically divide the topology information into a plurality of topological layers, Each topological layer may be associated with a respective set of components of the first computer system used by a resource to be potentially migrated from the first computer system to a cloud computer system The machine-readable instructions 710 may cause the processor 102 to, for each topological layer of the plurality of topological layers, identify each component from among the respective set of components, and for each of the identified components, generate an assessment of whether the identified component should be migrated to the cloud computer system based on the migration parameter.

The machine-readable instructions 710 may cause the processor 102 to store the assessments for the plurality of topological layers in association with the topology information.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium storing instructions that when executed by the processor, cause the processor to:
   access a migration parameter;
   obtain topology information relating to a resource to be potentially migrated from a first computer system to a second computer system, wherein the resource uses components of the first computer system;
   logically divide the topology information into a plurality of topological layers, wherein each topological layer is associated with a respective set of components of the first computer system used by the resource;
   for each topological layer of the plurality of topological layers:
   identify each component from among the respective set of components; and for each of the identified components, generate an assessment of whether the identified component is to be migrated to the second computer system based on the migration parameter.

2. The apparatus of claim 1, wherein the instructions cause the processor to:
obtain a predefined rule; and
apply the predefined rule with the migration parameter to generate the assessment for each component.

3. The apparatus of claim 1, wherein the instructions cause the processor to:
instantiate a machine-learned model of component migrations, the machine-learned model based on previous migration outcomes and previous parameters; and
apply the machine-learned model to generate the assessment for each component.

4. The apparatus of claim 1, Wherein the migration parameter comprises, for each component, one of: a cost associated with a migration of the component, a license model of the component, a security requirement of the component, a performance of the component, a customization of the component, or requirement of the component.

5. The apparatus of claim 1, wherein the instructions cause the processor to:
receive, after generation of a first assessment that a first component of a first topological layers is to be migrated, a request to migrate the first component;
identify a plurality of dependencies of the first component;
determine whether or not the second computer system satisfies the plurality of dependencies of the first component; and
generate a migration recommendation for the first component based on the determination of whether or not the second computer system satisfies the plurality of dependencies.

6. The apparatus of claim 5, wherein the second computer system comprises a cloud-based system provided by a cloud service provider, and wherein to determine whether or not the second computer system satisfies the plurality of dependencies of the first component, the instructions cause the processor to:
obtain an image of the cloud-based system that specifies available components provided at a compute instance of the cloud-based system; and
compare the available components with the plurality of dependencies.

7. The apparatus of claim 6, wherein the instructions cause the processor to:
determine that each of the plurality of dependencies is included in the available components of the compute instance based on the comparison, wherein the migration recommendation specifies that a migration of the first component be performed.

8. The apparatus of claim 6, wherein the instructions cause the processor to:
determine a dependency is not included in the available components of the compute instance based on the comparison; and
identify an available component from among the available components that is a potential replacement for the dependency, wherein the migration recommendation includes a recommendation to use the available component instead of the dependency.

9. The apparatus of claim 8, wherein the instructions cause the processor to:
automatically migrate the first component to the second computer system; and
store an indication that the first component was migrated with the available component used instead of the dependency.

10. The apparatus of claim 9, wherein the instructions cause the processor to:
update, based on the stored indication, a machine-learned model of resource migrations that includes a model of whether or not certain dependencies are interchangeable with certain available components.

11. The apparatus of claim 1, wherein the instructions cause the processor to:
determine that a first component of a first topological layer is governed by an acquired license; and
generate a recommendation that the first component not be automatically migrated but be installed at the second computer system via a platform as a service model.

12. The apparatus of claim 1, wherein the plurality of topological layers includes an application layer, and wherein to identify each component in the application layer, the instructions cause the processor to:
identify software components used in the application layer.

13. The apparatus of claim 1, wherein the plurality of topological layers includes a platform layer, and wherein to identify each component in the platform layer, the instructions cause the processor to:
identify middleware components used in the platform layer.

14. The apparatus of claim 1, wherein the plurality of topological layers includes an infrastructure layer, and wherein to identify each component in the infrastructure layer, the instructions cause the processor to:
identify backend or networking components used in the infrastructure layer.

15. The apparatus of claim 1, wherein the instructions cause the processor to:
detect a change in a topology of the first computer system, the change affecting a first component of the first computer system; and
update a first assessment of whether or not the first component is to be migrated based on the detected change.

16. A non-transitory computer readable medium storing machine readable instructions that when executed by a processor, cause the processor to:
access a migration parameter;
perform automated discovery on a first computer system;
generate topology information relating to the first computer system based on the automated discovery;
logically divide the topology information into a plurality of topological layers, wherein each topological layer is associated with a respective set of components of the first computer system used by a resource to be potentially migrated from the first computer system to a cloud computer system;
for each topological layer of the plurality of topological layers:
identify each component from among the respective set of components; and
for each of the identified components, generate an assessment of whether the identified component is to be migrated to the cloud computer system based on the migration parameter; and
store the assessments for the plurality of topological layers in association with the topology information.

17. The non-transitory computer readable medium of claim 16, wherein the instructions further cause the processor to:
- identify migrated components of the first computer system that were migrated to the cloud computer system;
- obtain an update to the topological information that describes a change made to the topological information since the migrated components were migrated; and
- generate a reverse migration recommendation that specifies migration of the components back to the first computer system from the cloud computer system based on the update.

18. A method comprising:
- accessing, by a processor, a migration parameter;
- obtaining, by the processor, topology information relating to a resource to be potentially migrated from a first computer system to a second computer system, wherein the resource uses components of the first computer system;
- logically dividing, by the processor, the topology information into a plurality of topological layers, wherein each topological layer is associated with a respective set of components of the first computer system used by the resource;
- for each topological layer of the plurality of topological layers:
  - identifying, by the processor, each component from among the respective set of components; and
  - for each of the identified components, generating, by the processor, an assessment of whether the identified component is to be migrated to the second computer system based on the migration parameter.

19. The method of claim 18, further comprising:
obtaining a predefined rule; and
applying the predefined rule with the migration parameter to generate the assessment for each component.

20. The method of claim 18, further comprising:
instantiating a machine-learned model of component migrations, the machine-learned model based on previous migration outcomes and previous parameters; and
applying the machine-learned model to generate the assessment for each component.

* * * * *